United States Patent
Wu et al.

(10) Patent No.: US 12,493,680 B2
(45) Date of Patent: Dec. 9, 2025

(54) VERIFICATION CODE PROCESSING METHOD AND APPARATUS, AND DEVICE AND STORAGE MEDIUM

(71) Applicant: BEIJING BYTEDANCE NETWORK TECHNOLOGY CO., LTD., Beijing (CN)

(72) Inventors: Yuanyi Wu, Beijing (CN); Chongwen Shi, Beijing (CN); Peng Yang, Beijing (CN); Wenqi Xie, Beijing (CN); Xuebin Zhu, Beijing (CN); Wenbin Duan, Beijing (CN); Yayu Jia, Beijing (CN); Xinyu Wang, Beijing (CN); Jiahui Li, Beijing (CN); Qiaoyou Luo, Beijing (CN); Wei Luo, Beijing (CN); Yongli Qin, Beijing (CN); Ming Yan, Beijing (CN); Junlin Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 255 days.

(21) Appl. No.: 18/252,650

(22) PCT Filed: Nov. 1, 2021

(86) PCT No.: PCT/CN2021/127907
§ 371 (c)(1),
(2) Date: May 11, 2023

(87) PCT Pub. No.: WO2022/105582
PCT Pub. Date: May 27, 2022

(65) Prior Publication Data
US 2024/0012897 A1 Jan. 11, 2024

(30) Foreign Application Priority Data
Nov. 20, 2020 (CN) .......................... 202011314870.8

(51) Int. Cl.
*G06F 21/36* (2013.01)

(52) U.S. Cl.
CPC ...... *G06F 21/36* (2013.01); *G06F 2221/2133* (2013.01)

(58) Field of Classification Search
CPC .. G06F 21/36; G06F 2221/2133; G06F 21/46; G06T 11/001
(Continued)

(56) References Cited

U.S. PATENT DOCUMENTS

2009/0308922 A1* 12/2009 Chaum .................. B42D 15/00
283/67
2011/0321138 A1* 12/2011 Kruger .................... G06F 21/31
726/4
(Continued)

FOREIGN PATENT DOCUMENTS

| CN | 102298763 A | 12/2011 |
|---|---|---|
| CN | 105471808 A | 4/2016 |

(Continued)

OTHER PUBLICATIONS

International Search Report (with English translation) and Written Opinion issued in PCT/CN2021/127907, dated Dec. 20, 2021, 11 pages provided.

*Primary Examiner* — Jacob Lipman
(74) *Attorney, Agent, or Firm* — Astute IP Law Group

(57) ABSTRACT

Provided are a verification code processing method and apparatus, and a device and a storage medium. The method comprises: upon receiving a trigger operation for verification code display, firstly acquiring a verification code image and verification code input prompt information; and then displaying the verification code image and the verification code input prompt information for verification code input. In the embodiments of the present disclosure, since a verification code image comprises one or more verification codes, (Continued)

at least one verification code is divided into a plurality of areas, and at least two areas are different in color, the overall structure of the verification code is destroyed, thereby improving the OCR resistance performance of the verification code, and achieving the purpose of effectively intercepting malicious behavior.

17 Claims, 9 Drawing Sheets

(58) Field of Classification Search
USPC .......................................................... 726/19
See application file for complete search history.

(56) References Cited

U.S. PATENT DOCUMENTS

2016/0028745 A1* 1/2016 Jastrebski ............... H04L 63/08
726/6
2017/0170967 A1* 6/2017 Luo ....................... H04L 9/3247

FOREIGN PATENT DOCUMENTS

| CN | 106157344 | A | | 11/2016 | | |
|----|-----------|---|---|---------|---|---|
| CN | 107844696 | A | | 3/2018 | | |
| CN | 110084030 | A | | 8/2019 | | |
| CN | 110348193 | A | | 10/2019 | | |
| CN | 110752933 | A | | 2/2020 | | |
| CN | 110851816 | A | * | 2/2020 | ............. | G06F 18/22 |
| CN | 111259366 | A | | 6/2020 | | |
| CN | 112417419 | A | | 2/2021 | | |
| TW | 201228323 | A1 | | 7/2012 | | |

* cited by examiner

VERIFICATION CODE PROCESSING METHOD AND APPARATUS, AND DEVICE AND STORAGE MEDIUM

This application is the national phase of International Patent Application No. PCT/CN2021/127907 filed on Nov. 1, 2021, which claims the priority to Chinese Patent Application No. 202011314870.8 titled "VERIFICATION CODE PROCESSING METHOD AND APPARATUS, AND DEVICE AND STORAGE MEDIUM", filed on Nov. 20, 2020 with the China National Intellectual Property Administration (CNIPA), both of which are incorporated herein by reference in their entireties.

FIELD

The present disclosure relates to the technical field of data processing, and in particular to a method and an apparatus for verification code processing, a device and a storage medium.

BACKGROUND

A verification code refers to characters, numbers, icon, and the like displayed on a background image used to verify the authenticity of a user. The verification code is inputted in many manners. For example, the verification code is inputted by entering the verification code displayed on the background image or by clicking on the verification code displayed on the background image.

The verification code is mainly used to determine whether a network service user is a human user or a computer program, and the input of the verification code may block the computer program and let the human user pass. However, images are more easily cracked as the development of machine learning and computer vision technology. In a case that an image is cracked, a verification code is almost useless due to poor performance in resisting the optical character recognition (OCR), and malicious behaviors cannot be intercepted.

SUMMARY

In order to solve the above technical problems or at least solve a part of the technical problems, a method and an apparatus for verification code processing, a device and a storage medium are provided, to improve OCR resistance performance of the verification code, and effectively intercept the malicious behaviors.

A method for verification code processing is provided according to a first aspect of the present disclosure. The method includes:
  acquiring a verification code image and verification code input prompt information, in response to a triggering operation for verification code display; and
  displaying the verification code image and the verification code input prompt information; where the verification code image includes one or more verification codes, at least one verification code among the one or more verification codes is divided into multiple regions, and at least two regions among the multiple regions are in different colors; and the verification code input prompt information is used to prompt to input the specified verification codes in the verification code image.

In an embodiment, pixels within a same region of the verification code are continuous, and at least two regions of the verification code are spaced by pixel interval.

In an embodiment, at least one verification code on the verification code image is in a form of a character, character strokes within a same region of the verification code are continuous, and character strokes are discontinuous between at least two regions of the verification code.

In an embodiment, a width/height direction of each of the multiple regions in the verification code is parallel to an overall width/height direction of the verification code; or a width/height direction of each of the multiple regions in the verification code is parallel to an overall width/height direction of the verification code image.

In an embodiment, the multiple regions in the verification code are identical in the width or height, and adjacent regions are in different colors.

In an embodiment, the verification codes on the verification code image at least include a first verification code and a second verification code, where, in the first verification code, pixels within a same region are continuous, and at least two regions are spaced by pixel interval; and in the second verification code, all regions are identical in the width or height, and adjacent regions are in different colors.

In an embodiment, the verification code is in a form of character, and the verification code image includes verification codes in at least two different fonts.

In an embodiment, a color difference between at least one of the multiple regions in the verification code and a background corresponding to the region conforms to a predetermined contrast.

In an embodiment, each verification code on the verification code image is divided into multiple regions, and in each verification code the multiple regions are in different colors.

A method for verification code processing is provided according to a second aspect of the present disclosure. The method includes
  receiving a triggering request for verification code display, and determining a verification code image and verification code input prompt information; where the verification code image includes one or more verification codes, at least one verification code among the one or more verification codes is divided into multiple regions, and at least two regions among the multiple regions are in different colors; and
  sending the verification code image and the verification code input prompt information in response to the triggering request; where the verification code input prompt information is used to prompt to input the specified verification codes in the verification code image.

In an embodiment, before determining the verification code image and the verification code input prompt information, the method further includes:
  dividing the verification code into multiple regions;
  determining colors respectively corresponding to the multiple regions, where at least two regions among the multiple regions are in different colors; and
  drawing the verification code on the background image based on colors respectively corresponding to the plurality of region, to obtain the verification code image with the verification code.

In an embodiment, the verification code is in a form of a character, and dividing the verification code into multiple regions includes: dividing the verification code into the multiple regions based on continuity between character strokes, where character strokes are discontinuous between adjacent regions.

An apparatus for verification code processing is provided according to a third aspect of the present disclosure. The apparatus includes:

a acquiring module, configured to acquire a verification code image and verification code input prompt information in response to a triggering operation for verification code display; and a display module, configured to display the verification code image and the verification code input prompt information, where the verification code image includes one or more verification codes, the one or more verification codes are divided into multiple regions, at least two regions among the multiple regions are in different colors, and the verification code input prompt information is used to prompt to input the specified verification codes in the verification code image.

An apparatus for verification code processing is provided according to a fourth aspect of the present disclosure. The apparatus includes:

a first determining module, configured to determine, on receipt of a triggering request for verification code display, a verification code image and verification code input prompt information, where the verification code image includes one or more verification codes, at least one verification code among the one or more verification codes is divided into multiple regions, and at least two regions among the multiple regions are in different colors; and a sending module, configured to send the verification code image and the verification code input prompt information; where the verification code input prompt information is used to prompt to input the specified verification codes in the verification code image.

A computer-readable storage medium is provided according to a fifth aspect of the present disclosure. The computer-readable storage medium stores instructions. The instructions, when being executed by a computer device, cause the computer device to perform the method for verification code processing described above.

A device is provided according to a sixth aspect of the present disclosure. The device includes a memory, a processor, and a computer program stored in the memory and executable on the processor, where the processor, when executing the computer program, performs the method for verification code processing described above.

Compared with the conventional technology, the technical solutions according to the embodiments of the present disclosure have the following advantages.

A method for verification code processing is provided according to embodiments of the present disclosure. On receipt of a triggering operation for verification code display, a verification code image and verification code input prompt information are acquired, and the verification code image and the verification code input prompt information are displayed to a user, so that the user may input a verification code specified in the prompt information to achieve the input of the verification code. According to the embodiments of the present disclosure, the verification code image includes one or more verification codes, at least one verification code among the one or more verification codes is divided into multiple regions, and at least two regions among the multiple regions are in different colors, which breaks an overall structure of the verification code, improves OCR resistance performance of the verification code, and effectively intercepts the malicious behaviors.

BRIEF DESCRIPTION OF THE DRAWINGS

The drawings herein are incorporated into the specification and constitute a part of the specification. The drawings show embodiments of the present disclosure. The drawings and the specification are used to explain the principle of the present disclosure.

In order to more clearly illustrate technical solutions in embodiments of the present disclosure or in the conventional technology, the drawings to be used in the description of the embodiments or the conventional technology are briefly described below. Apparently, those skilled in the art may obtain other drawings according to the provided drawings without any creative work.

DETAILED DESCRIPTION

Figure 1A:
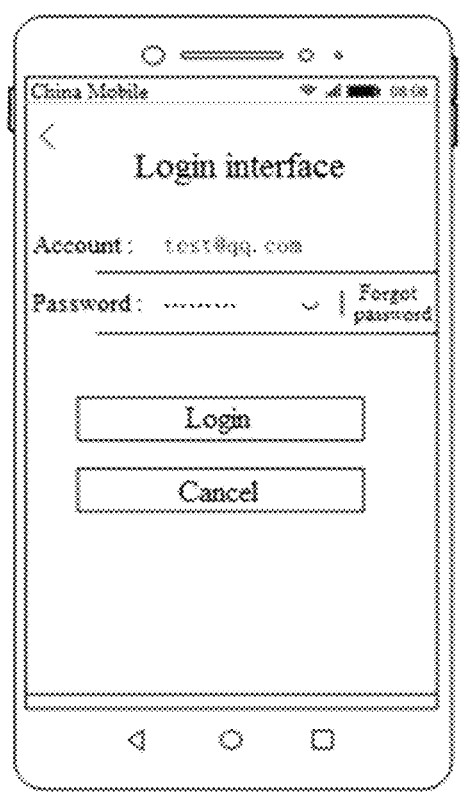
FIG. 1a is a schematic diagram of a login interface according to an embodiment of the present disclosure.

In order to make the objectives, features, and advantage of the present disclosure more apparent and easy to understand, the technical solutions in the embodiments of the present disclosure are further described hereinafter. It should be noted that the embodiments of the present disclosure and the features in the embodiments may be combined with each other if there is no conflict.

In the following description, numerous specific details are set forth in order to provide thorough understanding of the present disclosure. The present disclosure may also be implemented in other ways different from those described herein. Apparently, the embodiments in the specification are only a part of the embodiments of the present disclosure, rather than all the embodiments.

The verification code is mainly used to determine whether a network service user is a human user or a computer program, and the input of the verification code may block the computer program and let the human user pass.

In practices, before the input of the verification code, one or more verification codes are displayed to a user on a verification code image. The user may perform a series of tasks such as entering the verification code or clicking on the verification code based on verification code input prompt information, ultimately achieving the input of the verification code. However, the accuracy in recognizing verification code by of a computer program is improved as the development of machine learning and computer vision technology, resulting in a high success rate for the computer program to input the verification code.

Based on this, a method for verification code processing is provided according to the present disclosure. On receipt of a triggering operation for verification code display, a verification code image and verification code input prompt information are acquired, and the verification code image and the verification code input prompt information are displayed to a user, so that the user may input a verification code specified in the prompt information to achieve the input of the verification code. According to the embodiment of the present disclosure, the verification code image includes one or more verification codes, at least one verification code among the one or more verification codes is divided into multiple regions, and at least two regions among the multiple regions are in different colors, which breaks an overall structure of the verification code, improves OCR resistance performance of the verification code, and effectively intercepts the malicious behaviors.

Before the method for verification code processing is described in detail, the process of the input of the verification code according to the embodiment of the present disclosure is briefly described, in order to facilitate understanding of the method for verification code processing according to the present disclosure.

The process of processing a verification code according to the embodiment of the present disclosure is described as follows. When a user uses a network service (such as logging into a video website), an account and a password are entered on a login interface shown in FIG. 1a. After the account and the password are entered, display of a security verification floating window is triggered in response to an operation of clicking on a login button. Otherwise, the login interface is exited. As shown in FIG. 1b, the security verification floating window is displayed on the login interface in response to the operation of clicking on the login button. The security verification floating window shows the verification code required to be inputted by the user and the verification code input prompt information. The user may sequentially click on verification codes in a form of Chinese characters "执 衙 伞 鸟" by following an instruction in the verification code input prompt information, to achieve the input of the verification code.

After the user sequentially clicks on the verification codes in the form of Chinese characters "执 衙 伞 鸟" in response to the instruction, a system verifies the verification codes sequentially inputted by the click operation, to obtain a verification result with respect to the verification codes. In a case that the verification result indicates successful security verification, a video display interface of the video website is displayed to the user, as shown in FIG. 1c. The user may enjoy a corresponding network service, such as watching videos. In a case that the verification result indicates failed security verification, information entered for the account and the password is cleared, and the user is required to re-enter login information and try logging in again.

In order to reduce the accuracy for a computer program in recognizing the verification code displayed in FIG. 1b, and thereby reduce the success rate of the computer program for inputting the verification code, a verification code displayed on a verification code input interface may be processed according to the embodiments of the present disclosure. In an embodiment, each of the verification codes in the form of Chinese characters "鸟", "伞", "衙", and "执" is divided into multiple regions, and the multiple regions are set with different colors, to break the overall structure of the verification code, thereby reducing the accuracy of the computer program in recognizing the verification code, and ultimately reducing the success rate of the computer program in inputting the verification code.

Figure 1B:
FIG. 1b is a schematic diagram of a login interface with a security verification floating window according to an embodiment of the present disclosure.
Figure 1C:
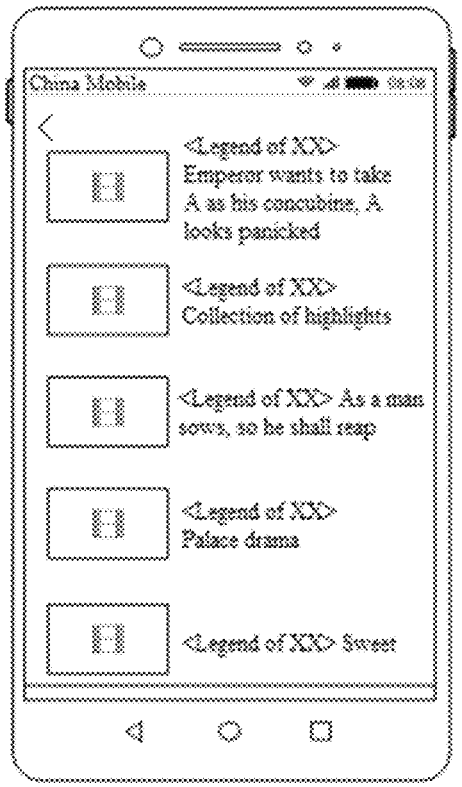
FIG. 1c is a schematic diagram of a video display interface according to an embodiment of the present disclosure.

FIGS. 1a to 1c only show one application scenario of the method for verification code processing described above. In practices, the triggering operation for verification code display may be in a triggered manner or in an embedded manner. The triggered manner is that a triggering button for the verification code display is displayed on the login interface as shown in FIG. 1a, which is used to guide the user to use the verification code. In response to the user clicking on the triggering button for the verification code display, the verification code image and the verification code input prompt information are displayed to the user. In addition, the embedded manner is that the verification code image and the verification code input prompt information are directly displayed to the user on the login interface as shown in FIG. 1a. For example, on a display region below the region for displaying the account and the password in FIG. 1a, the verification code image and the verification code input prompt information are displayed for the user to input the verification code.

Figure 2:
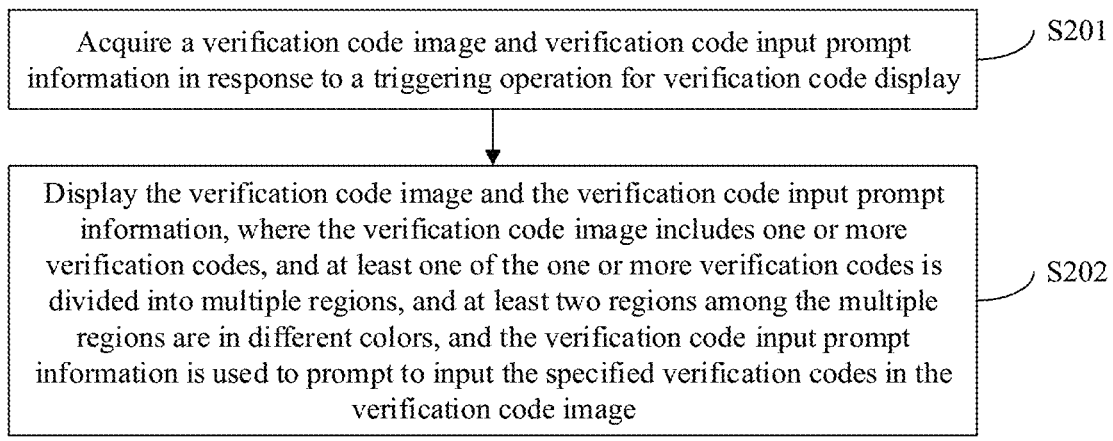
FIG. 2 is a flow chart of a method for verification code processing according to an embodiment of the present disclosure.

Based on this, a method for verification code processing is provided according to an embodiment of the present disclosure. Reference is made to FIG. 2, which is a flow chart of a method for verification code processing according to an embodiment of the present disclosure. The method includes the following steps S201 and S202.

In step S201, a verification code image and verification code input prompt information are acquired in response to a triggering operation for verification code display.

In the embodiment of the present disclosure, the verification code display may be applied to various pages for which it is required to determine whether a network service user is a human user. The triggering operation for the verification code display may be an operation of opening the above pages, such as opening a login page of a service website.

In practices, when the triggering operation for the verification code display is detected, the verification code image and the verification code input prompt information are acquired from a server, for implementing the input of the verification code. The verification code image displays a verification code. The verification code may be in a form of character, icon, and the like, which is the basis for the input of the verification code.

In the embodiment of the present disclosure, the verification code input prompt information is used to prompt to input specified verification code(s) in the verification code image. Normally, the specified verification codes prompted by the verification code input prompt information are inputted in an order. For example, the verification codes in a form of Chinese character are inputted by clicking on the verification codes in the following order: " ", " ", " " and then " ". In addition, the verification code input prompt information may further used to prompt an operation manner for inputting the verification code(s), such as a clicking operation.

In step S202, the verification code image and the verification code input prompt information are displayed.

The verification code image includes one or more verification codes. At least one verification code among the one or more verification codes is divided into multiple regions, and at least two regions among the multiple regions are in different colors. The verification code input prompt information is used to prompt to input the specified verification codes in the verification code image.

In practices, after the verification code image and the verification code input prompt information are acquired from the server, the verification code image and the verification code input prompt information are displayed on the page, for implementing the input of the verification code.

In the embodiment of the present disclosure, the verification code image includes one or more verification codes, at least one verification code on the verification code image is divided into multiple regions, and at least two regions among the multiple regions are in different colors. In a case that at least two verification codes on the verification code image are each divided into multiple regions, the two verification codes may have different numbers of divided regions. For example, one verification code is divided into two regions, and the other verification code is divided into four regions.

In the embodiment of the present disclosure, at least one verification code on the verification code image is divided into multiple regions, and at least two regions in the verification code are in different colors, so that the overall structure of the verification code is broken, thus improving the OCR resistance performance of the verification code, and effectively intercepting the malicious behaviors.

Based on the method for verification code processing according to the embodiments described above, the verification code displayed on the verification code image may be divided into regions in the following manners according to embodiments of the present disclosure.

In an embodiment, a width/height direction of each of the multiple regions in the verification code may be parallel to an overall width/height direction of the verification code. The overall width/height direction of the verification code refers to an inclination angle between the verification code and the horizontal direction or the vertical direction. A division line may be determined for the verification code based on this inclination angle, and then the verification code may be divided into regions based on this division line to obtain a region-divided verification code.

Figure 3:
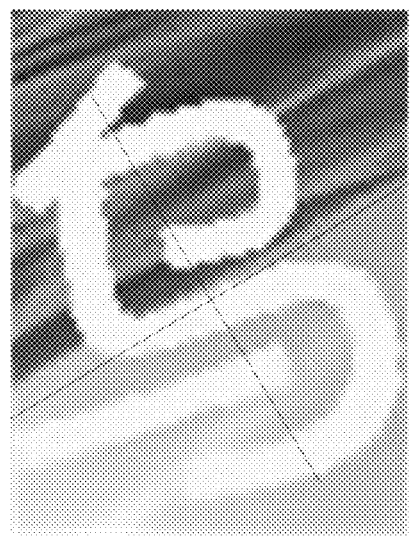
FIG. 3 is a schematic diagram showing an effect of regional division for a verification code according to an embodiment of the present disclosure.

Reference is made to FIG. 3, which is a schematic diagram showing an effect of regional division for a verification code according to an embodiment of the present disclosure. The verification code in a form of Chinese character " " tilts to the left by about 30 degrees overall, then the division line may be determined based on the inclination angle, and the verification code is divided into four regions based on the division line. The four regions may be identical or different in the width or height.

In another embodiment, the width/height direction of each of the regions in the verification code may be parallel to a width/height direction of the verification code image. The width/height direction of the verification code image refers to a width direction or a height direction of the verification code image.

Figure 4:
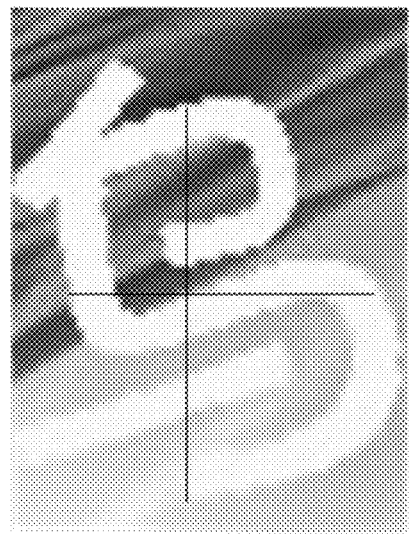
FIG. 4 is a schematic diagram showing an effect of regional division for a verification code according to another embodiment of the present disclosure.

Reference is made to FIG. 4, which is a schematic diagram showing an effect of regional division for a verification code according to another embodiment of the present disclosure. The verification code is divided into multiple regions based on the width/height direction of the verification code image. The multiple regions may be identical or different in the width or height.

In another embodiment, pixels within a same region of the verification code are continuous, and at least two regions of the verification code are spaced by pixel interval. It can be understood that each of the regions in the verification code has connectivity.

Figure 5:
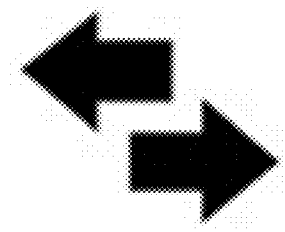
FIG. 5 is a schematic diagram showing an effect of regional division for a verification code according to another embodiment of the present disclosure.

Reference is made to FIG. 5, which is a schematic diagram showing an effect of regional division for a verification code according to another embodiment of the present disclosure. The verification code is in the form of an icon, and the verification code is divided into two regions indicated by an arrow pointing to the left and an arrow pointing to the right. Pixels within each of the regions are continuous, and different regions are spaced by pixel interval.

In practices, at least one verification code on the verification code image is in a form of character. In a case that the verification code is in the form of character, the verification code is divided into multiple regions based on a character structure of the verification code according to the embodiment of the present disclosure, where the character structure is formed by continuous character strokes. Specifically, character strokes within a same region of the verification code are continuous, and character strokes are discontinuous between at least two regions of the verification code. In an embodiment, character strokes are disconnected between adjacent regions.

For example, the verification code as a Chinese character " " may be divided into two regions, i.e., an upper horizontal region and a lower horizontal region. The verification code as a Chinese character " " may be divided into a left region and a right region based on the left-right character structure. Each of the divided regions is formed by continuous character strokes, and the character strokes are discontinuous between different regions.

In addition, character font affects the recognition accuracy of the computer program for a verification code in the form of character. Therefore, font of the verification code may be set according to the embodiment of the present disclosure, so that the verification code image includes verification codes with at least two different fonts. For example, the verification code image has a verification code in Song typeface, and further has a verification code in regular script.

In addition, the font of the verification code may be set based on a favorite font of the user, so as to ensure a user experience during the input of the verification code.

In another embodiment, the multiple regions in the verification code are identical in the width or height, and adjacent regions are in different colors. Normally, the verification code is divided into regions based on a predetermined width or a predetermined height.

Figure 6:
FIG. 6 is a schematic diagram showing an effect of regional division for a verification code according to another embodiment of the present disclosure.

Reference is made to FIG. 6, which is a schematic diagram showing an effect of regional division for a verification code according to another embodiment of the present disclosure. The verification code as a Chinese character "慈" is divided into regions with a same height, and adjacent regions are in different colors. For example, adjacent regions are set with alternate yellow and blue, which is not shown in the Figure.

In another embodiment, verification codes on the verification code image may be divided into regions in different manners, among which at least two manners are described above.

In an embodiment, the verification code image may at least include a first verification code and a second verification code. In the first verification code, pixels within a same region are continuous, and at least two regions are spaced by pixel interval, such as the verification code in the form of icon as shown in FIG. 5. In the second verification code, all regions are identical in the width or height, and adjacent regions are in different colors, such as the verification code in the form of Chinese character "慈" as shown in FIG. 6. According to the embodiment of the present disclosure, the verification code image may display at least two verification codes including the icon in FIG. 5 and the Chinese character "慈" in FIG. 6.

According to the embodiment of the present disclosure, the verification codes are divided into regions in different manners, further improving the OCR resistance performance of the verification code, and effectively intercepting the malicious behaviors.

In another embodiment, each verification code on the verification code image is divided into multiple regions, and the multiple regions in the verification code are in different colors.

Figure 7:
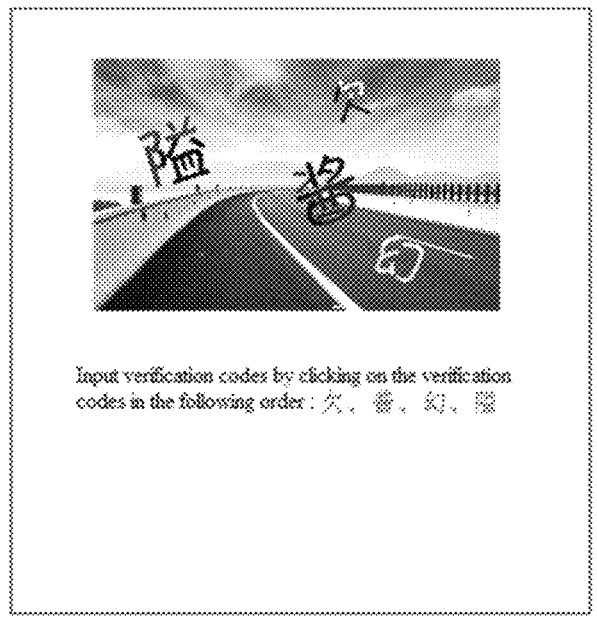
FIG. 7 is a schematic diagram of a verification code input interface according to another embodiment of the present disclosure.

Reference is made to FIG. 7, which is a schematic diagram of a verification code input interface according to another embodiment of the present disclosure. The verification code image includes four verification codes in the Chinese characters of 欠, 蟾, 幻, 播. Each verification code is divided into four regions, and the four regions in the verification code are in different colors. Four regions in a same verification code may be identical or different in width or height.

Figure 8:
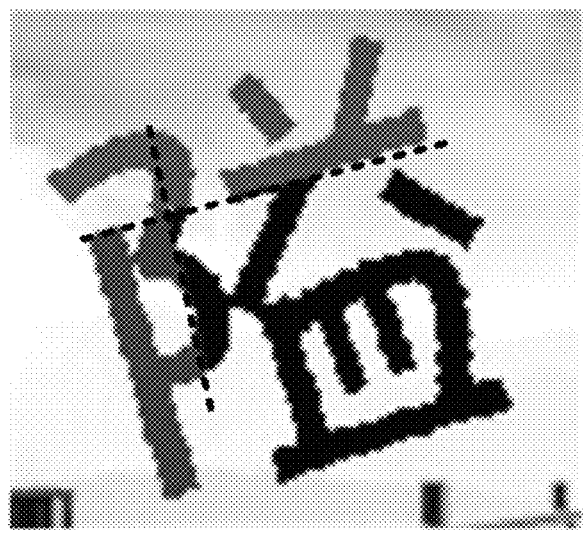
FIG. 8 is a schematic diagram showing an effect of regional division for a verification code according to another embodiment of the present disclosure.

For better understanding, a verification code as Chinese character "播" in FIG. 7 is taken as an example. The verification code "播" is divided into four regions, and a width/height direction of each of the regions is the same as the overall width/height direction of the verification code "播". As shown in FIG. 8, the verification code "播" is divided into four regions with different widths and heights by bold dashed lines. The upper left region may be set with red, the lower left region may be set with green, the upper right region may be set with gray, and the lower right region may be set with green, which are not shown in the Figure.

In addition, in practices, the input of a verification code is an operation that requires a user to click or enter by following an instruction, ultimately implementing the input of the verification code. Therefore, according to the embodiment of the present disclosure, the verification code displayed on the verification code image needs to ensure the experience of a human user while reducing the recognition accuracy of the computer program.

For example, from the perspective of visual effects, the verification code displayed on the verification code image should be legible to the human user, so that the human user can successfully input the verification code based on the displayed verification code, ensuring the experience of the human user in the input of the verification code.

Therefore, according to the embodiment of the present disclosure, in a case that the verification code on the verification code image is divided into multiple regions, a color difference between at least one of the regions and a background corresponding to the region conforms to a predetermined contrast, thereby ensuring the verification code recognition and verification code input experience of the human user.

Figure 9:
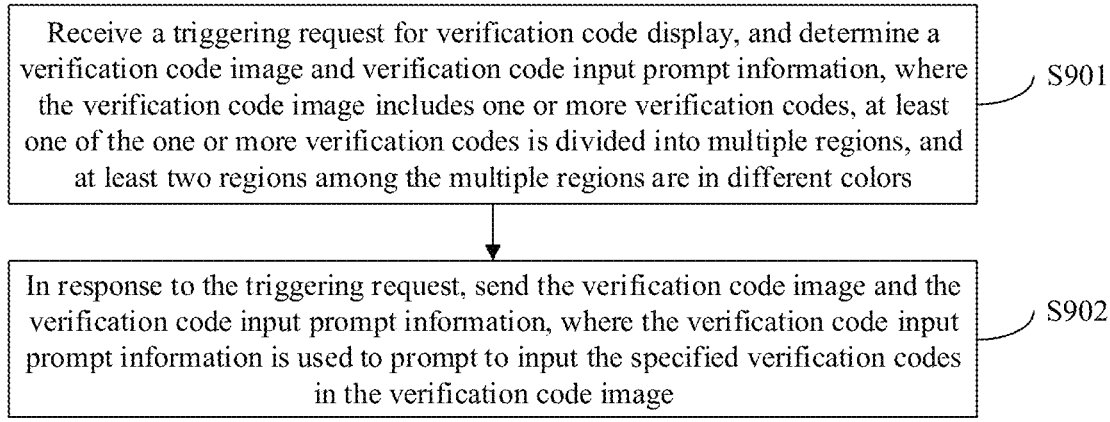
FIG. 9 is a flow chart of a method for verification code processing according to another embodiment of the present disclosure.

Based on the above embodiments, a method for verification code processing from the perspective of a server is introduced herein. Reference is made to FIG. 9, which is a flow chart of a method for verification code processing according to another embodiment of the present disclosure. The method includes the following step S901 and S902.

In step S901, a triggering request for verification code display is received, and a verification code image and verification code input prompt information are determined.

The verification code image includes one or more verification codes, and at least one verification code among the one or more verification codes is divided into multiple regions, and at least two regions among the multiple regions are in different colors.

In step S902, the verification code image and the verification code input prompt information are sent in response to the triggering request.

The verification code input prompt information is used to prompt to input the specified verification code(s) in the verification code image.

In practices, before the verification code image is determined, the verification code image is first generated. Specifically, the verification code and a background image are predetermined, then the verification code is divided into multiple regions, and colors respectively corresponding to the multiple regions is determined. At least two regions among the multiple regions divided for a same verification code are in different colors. Furthermore, the verification code is drawn on the background image based on the colors corresponding to the regions, to obtain the verification code image with the verification code.

In an embodiment, a verification code is divided into multiple regions, and colors of the multiple regions may be randomly set. For example, the multiple regions may be in different colors.

In another embodiment, colors of the multiple regions in the verification code may be set based on a color of the background image, which is described in details in the following embodiment.

In the method for verification code processing according to the embodiment of the present disclosure, on receipt of a triggering request for verification code display, a verification code image and verification code input prompt information are determined, and the verification code image and the verification code input prompt information are sent to a user terminal, so that the user can input the verification code. According to the embodiment of the present disclosure, a verification code on the verification code image is divided into multiple regions, and at least two regions among the multiple regions are set with different colors, to break the overall structure of the verification code, thereby improving the OCR resistance performance of the verification code and effectively intercepting malicious behaviors.

For purpose of the experience of the human user in inputting the verification code, colors of the regions in the verification code may be set based on the color of the background image, to ensure a color contrast between each of the regions and a background of the region on the background image, so that the verification code may be successfully recognized by the human user, improving the experience of the human user in inputting the verification code.

Figure 10:
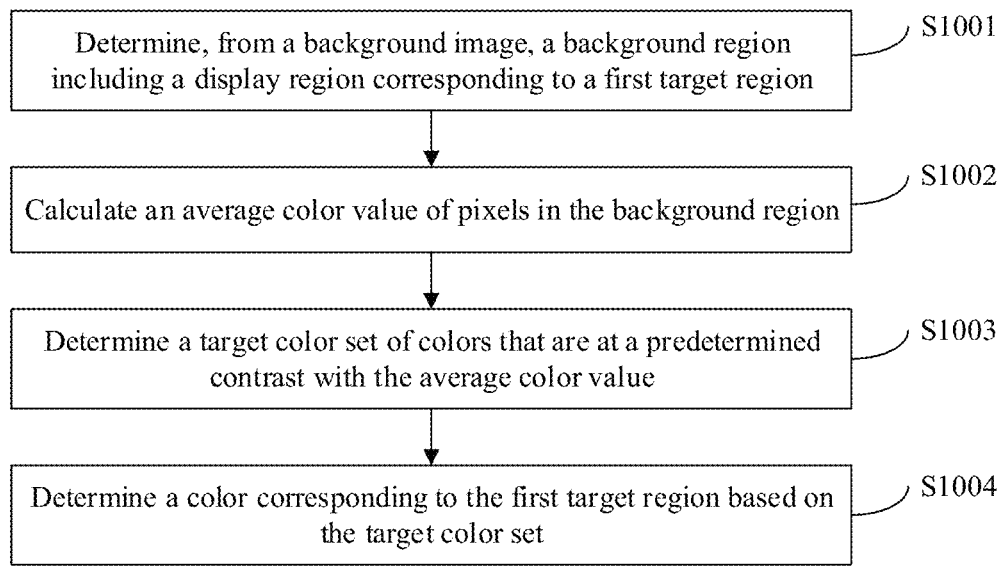
FIG. 10 is a flow chart of a method for determining a color of a region in a verification code according to an embodiment of the present disclosure.

Reference is made to FIG. 10, which is a flow chart of a method for determining a color of a region in a verification code according to an embodiment of the present disclosure. Hereinafter, one of the multiple divided regions of the verification code is referred to as a first target region. The method may include the following steps S1001 to S1004.

In step S1001, a target background region including a display region corresponding to the first target region is determined from the background image.

In the embodiment of the present disclosure, the background image is an image for displaying the verification code, which may be various types of images such as landscapes and portraits.

In the embodiment of the present disclosure, before a color value of the first target region is determined, the display region in the background image corresponding to the first target region of the verification code is determined. The display region corresponding to the first target region refers to a region formed by pixels of the background image which are covered by the first target region after the first target region is displayed on the background image. The background region including the display region is determined from the background image.

In an embodiment, colors of the pixels covered by the first target region are relatively close to colors of surrounding pixels. Therefore, according to the embodiment of the present disclosure, the color corresponding to the first target region may be determined based on the colors of the pixels covered by the first target region, to ensure a color contrast between the first target region and the pixels covered by the first target region, so as to ensure the experience of the human user in inputting the verification code.

In another embodiment, a region of a predetermined size in the background image, which includes the display region corresponding to the first target region, may be determined as the background region. Specifically, a region including the verification code may be first determined; subsequently, when the verification code is divided into multiple regions, the region including the verification code may be divided into a corresponding number of regions.

Figure 11:
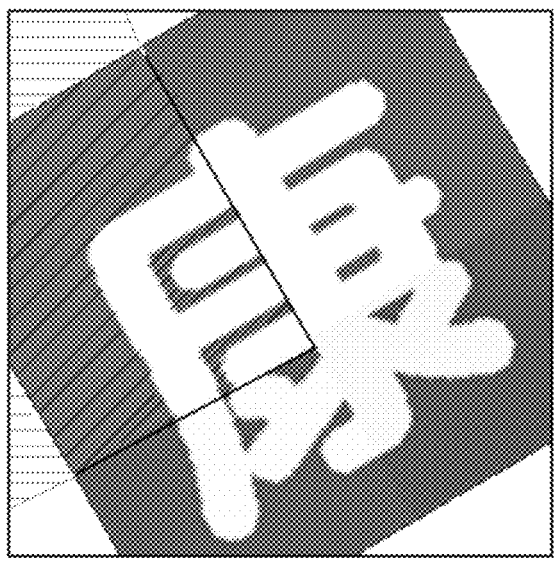
FIG. 11 is a schematic diagram of determining a background region according to an embodiment of the present disclosure.

Reference is made to FIG. 11, which is a schematic diagram of determining a background region according to an embodiment of the present disclosure. The region with slant lines is determined, based on the width/height direction of the verification code, as a region including the verification code. The region with horizontal lines is determined, based on the width/height direction of the background image, as a region including the verification code. In order to ensure that the region with slant lines, even after rotation, does not exceed a boundary of the region with horizontal lines, the boundary of the region with horizontal lines is set to be $\sqrt{2}$ times of a side length of the region with slant lines. In a case that the verification code in the form of Chinese character " 纂 " is divided into four regions, the region with slant lines and the region with horizontal lines each are divided into four regions. The region with slant lines corresponding to the first target region and the region with horizontal lines corresponding to the first target region are shown in FIG. 11.

Based on this, assuming that an upper left part of the verification code in the form of Chinese character " 纂 " is the first target region, the region with slant lines on the background image, which corresponds to the first target region, may be determined as the background region, for determining the color corresponding to the first target region.

Alternatively, according to the embodiment of the present disclosure, the region corresponding to the first target region, the region with slant lines corresponding to the first target region, and the region with horizontal lines corresponding to the first target region on the background image are determined as the background region, such as the upper left part of FIG. 11 shown with black bold lines.

In step S1002, an average color value of pixels in the background region is calculated.

In the embodiment of the present disclosure, after the background region is determined in the background image, the average color value of the pixels in the background region is calculated to determine the color corresponding to the first target region.

In an embodiment, a color value of a pixel may be expressed by color values of Red, Green, and Blue (RGB) color channels. According to the embodiment of the present disclosure, an average color value in each color channel may be calculated for the pixels in the background region, and the average color value of the pixels in the background region is formed by average color values in the three color channels.

In step S1003, a target color set of colors that are at a predetermined contrast with the average color value is determined.

In the embodiment of the present disclosure, after the average color value of the pixels in the target background region is determined, the target color set of colors that are at the predetermined contrast with the average color value is further determined. The target color set includes colors that are at the predetermined contrast with the average color value. In addition, the colors in the target color set may have transparency and saturation close to the average color value, to improve the user experience for the human user.

The manner for determining the target color set of colors at the predetermined contrast with the average color value is not limited in the embodiment of the present disclosure.

In step S1004, the color corresponding to the first target region is determined based on the target color set.

In the embodiment of the present disclosure, after the target color set is determined, a color is determined from the target color set as the color corresponding to the first target region.

In the same way, colors corresponding to other regions of the verification code may be determined, so that the verification code and the background image have the predetermined color contrast, facilitating the human user to recognize the displayed verification code, thus achieving the input of the verification code.

In summary, with the method for verification code processing according to the embodiment of the present disclosure, the OCR resistance performance of the verification code can be improved, and malicious behaviors can be effectively intercepted, ensuring the experience of the human user, and improving user experience in the input of the verification code.

Figure 12:
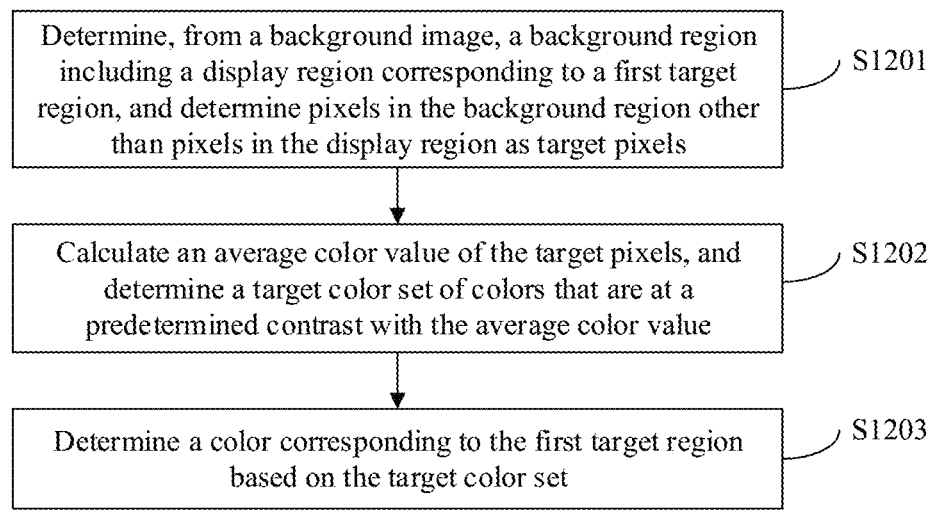
FIG. 12 is a flow chart of a method for determining a color of a region in a verification code according to another embodiment of the present disclosure.

In addition, a method for determining a color of a region in a verification code is provided according to another embodiment of the present disclosure. Reference is made to FIG. 12, which is a flow chart of a method for determining a color of a region in a verification code according to another embodiment of the present disclosure. The method includes the following steps S1201 to S1203.

In step S1201, a background region including the display region corresponding to the first target region is determined from the background image, and pixels in the background region other than pixels in the display region are determined as target pixels.

Colors of pixels around the display region corresponding to the first target region greatly affect the determination of the color corresponding to the first target region. Therefore, according to the embodiment of the present disclosure, the color corresponding to the first target region may be determined based on the colors of the pixels around the display region corresponding to the first target region.

In the embodiment of the present disclosure, after the background region including the display region corresponding to the first target region is determined in the background image, the pixels in the background region other than pixels in the display region are determined as the target pixels for determining the color corresponding to the first target region.

As shown in FIG. 11, pixels in the region with slant lines other than the pixels covered by the first target region are determined as the target pixels.

In step S1202, an average color value of the target pixels is calculated, and a target color set of colors that are at the predetermined contrast with the average color value is determined.

In the embodiment of the present disclosure, after the target pixels are determined, the average color value of the target pixels is calculated. For understanding the manner for determining the average color value, reference may be made to the above embodiments, which is not repeated herein.

After the average color value of the target pixels is determined, the target color set of colors that are at the predetermined contrast with the average color value may be determined. Specifically, the manner for determining the target color set is not limited in the embodiment of the present disclosure.

In step S1203, the color corresponding to the first target region is determined based on the target color set.

In the embodiment of the present disclosure, after the target color set is determined, a color is determined from the target color set as the color corresponding to the first target region.

In the same way, the colors corresponding to other regions of the verification code may be determined, so that the color of the verification code is at the predetermined contrast with the background image, facilitating the human user to recognize the displayed verification code, and thus achieving the input of the verification code.

In summary, with the method for verification code processing according to the embodiment of the present disclosure, the OCR resistance performance of the verification code can be improved, and malicious behaviors can be effectively intercepted, ensuring the user experience of the human user.

Figure 13:
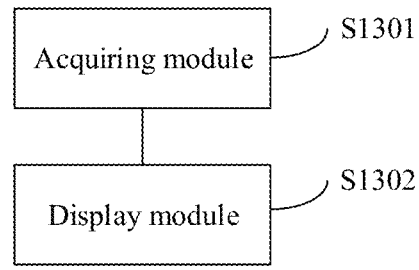
FIG. 13 is a schematic structural diagram of an apparatus for verification code processing according to an embodiment of the present disclosure.

Based on the same invention concept as the method for verification code processing according to the above embodiments, an apparatus for verification code processing is further provided according to the present disclosure. Reference is made to FIG. 13, which is a schematic structural diagram of an apparatus for verification code processing according to an embodiment of the present disclosure. The apparatus includes an acquiring module 1301 and a display module 1302.

The acquiring module 1301 is configured to acquire a verification code image and verification code input prompt information in response to a triggering operation for verification code display.

The display module 1302 is configured to display the verification code image and the verification code input prompt information. The verification code image includes one or more verification codes, each of the one or more verification codes is divided into multiple regions, and at least two regions among the multiple regions are in different colors. The verification code input prompt information is used to prompt to input the specified verification codes in the verification code image.

In an embodiment, pixels within a same region of the verification code are continuous, and at least two regions in the verification code are spaced by pixel interval.

In an embodiment, the verification code is in a form of character; character strokes within a same region of the verification code are continuous, and character strokes are discontinuous between at least two regions of the verification code.

In an embodiment, a width/height direction of each of the regions in the verification code is parallel to an overall width/height direction of the verification code; or a width/height direction of each of the regions in the verification code is parallel to a width/height direction of the verification code image.

In an embodiment, the multiple regions in the verification code are identical in the width or height, and adjacent regions are in different colors.

In an embodiment, the multiple verification codes on the verification code image at least include a first verification code and a second verification code. In the first verification code, pixels within a same region are continuous, and at least two regions are spaced by pixel interval; and in the second verification code, all regions are identical in the width or height, and adjacent regions are in different colors.

In an embodiment, the verification code is in the form of character, and the verification code image includes verification codes in at least two different fonts.

In an embodiment, a color difference between at least one of the multiple regions in the verification code and a background corresponding to the region conforms to a predetermined contrast.

In an embodiment, each verification code on the verification code image is divided into multiple regions, and in each verification code the multiple regions are in different colors.

According to the embodiments of the present disclosure, the verification code image includes one or more verification codes, at least one verification code among the one or more verification codes is divided into multiple regions, and at least two regions among the multiple regions are in different colors, which breaks an overall structure of the verification code, improves OCR resistance performance of the verification code, and effectively intercepts the malicious behaviors.

Figure 14:
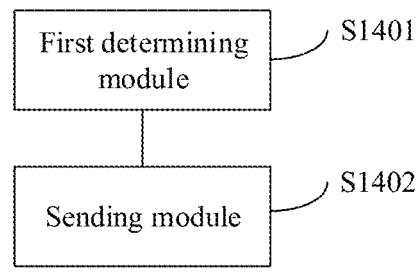
FIG. 14 is a schematic structural diagram of an apparatus for verification code processing according to another embodiment of the present disclosure.

Based on the same invention concept as the method for verification code processing according to the above embodiments, an apparatus for verification code processing is further provided according to the present disclosure. Reference is made to FIG. 14, which is a schematic structural diagram of an apparatus for verification code processing according to another embodiment of the present disclosure. The apparatus includes a first determining module 1401 and a sending module 1402.

The first determining module 1401 is configured to determine, on receipt of a triggering request for verification code display, a verification code image and verification code input prompt information. The verification code image includes one or more verification codes, at least one verification code among the one or more verification codes is divided into multiple regions, and at least two regions among the multiple regions are in different colors.

The sending module 1402 is configured to send the verification code image and the verification code input prompt information. The verification code input prompt information is used to prompt to input the specified verification codes in the verification code image.

In an embodiment, the apparatus further includes a dividing module, a second determining module and a drawing module.

The dividing module is configured to divide the verification code into multiple regions.

The second determining module is configured to determine colors respectively corresponding to the multiple regions, where at least two regions among the multiple regions are in different colors.

The drawing module is configured to draw the verification code on the background image based on the colors respectively corresponding to the multiple regions, to obtain the verification code image with the verification code.

In the apparatus for verification code processing according to the embodiments of the present disclosure, at least one verification code on the verification code image is divided into multiple regions, and at least two regions among the multiple regions are in different colors, which breaks an overall structure of the verification code, improves OCR resistance performance of the verification code, and effectively intercepts the malicious behaviors.

In addition, in the apparatus for verification code processing according to the embodiments of the present disclosure, each of the regions divided in the verification code may be set with a color that is at a predetermined contrast with the color of the background image, facilitating the human user to recognize the displayed verification code, thus achieving the input of the verification code. It can be seen that according to the embodiments of the present disclosure, the OCR resistance performance of the verification code can be improved, and malicious behaviors can be effectively intercepted, ensuring the experience of the human user.

In addition to the method and the apparatus described above, a computer-readable storage medium is further provided according to an embodiment of the present disclosure. The computer-readable storage medium stores instructions. The instructions, when being executed by a terminal device, cause the terminal device to perform the method for verification code processing according to the embodiments of the present disclosure.

Figure 15:
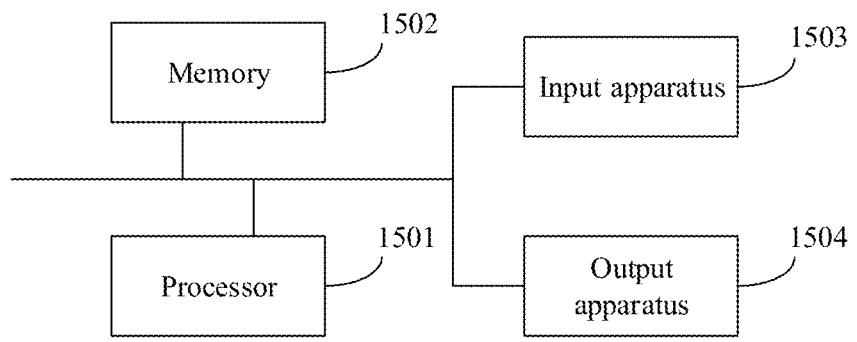
FIG. 15 is a schematic structural diagram of a device for verification code processing according to an embodiment of the present disclosure.

In addition, a device for verification code processing is further provided according to an embodiment of the present disclosure. As shown in FIG. 15, the device may include a processor 1501, a memory 1502, an input apparatus 1503 and an output apparatus 1504. The device for verification code processing may include one or more processors 1501 and FIG. shows the case of one processor. In some embodiments of the present disclosure, the processor 1501, the memory 1502, the input apparatus 1503 and the output apparatus 1504 may be connected through a bus or other manner. In FIG. 15, a connection through the bus is taken as an example.

The memory 1502 may be configured to store a software program and modules. The processor 1501 runs the computer program and the modules stored in the memory 1502, to perform various functional applications and data processing of the device for verification code processing. The memory 1502 may mainly include a program memory area and a data memory area. An operating system and a computer program required by at least one function are stored in the program memory area. In addition, the memory 1502 may include a high-speed random access memory, and may further include a non-volatile memory, such as at least one disk storage device, a flash device or other volatile solid-state storage device. The input apparatus 1503 may be configured to receive inputted number or character information, and input a signal related to user settings and function control of the device for verification code processing.

In the embodiment of the present disclosure, the processor 1501 may load an executable file corresponding to the processes of one or more computer programs into the memory 1502 by following an instruction, and the processor 1501 runs the application program stored in the memory 1502, thereby achieving various functions in the device for verification code processing described above.

It should be noted that the relationship terminologies such as "first" and "second" are only used herein to distinguish one entity or operation from another entity or operation, rather than to necessitate or imply that the actual relationship or order exists between the entities or operations. Moreover, terms of "include", "comprise" or any other variants thereof are intended to be non-exclusive. Therefore, a process, method, article or device including a series of elements includes not only the elements but also other elements that are not explicitly listed, or also includes the elements inherent for the process, method, article or device. Unless expressively limited otherwise, the statement "comprising (including) one . . . " does not exclude the case that other similar elements may exist in the process, method, article or device.

The above are only specific implementations of the present disclosure, so that those skilled in the art can understand or implement the present disclosure. It is apparent for those skilled in the art to make many modifications to these embodiments. The general principle defined herein may be implemented in other embodiments without departing from the spirit or scope of the present disclosure. Therefore, the present disclosure is not limited to the embodiments disclosed herein, but is to conform to the widest scope in accordance with the principle and novel features disclosed herein.

The invention claimed is:

1. A method for verification code processing, comprising:
acquiring a verification code image and verification code input prompt information in response to a triggering operation for verification code display; and
displaying the verification code image and the verification code input prompt information; wherein the verification code image comprises one or more verification codes, each verification code on the verification code image is divided into a plurality of regions, and in each verification code all of the plurality of regions are in different colors, a color difference between at least one of the plurality of regions in the verification code and a background corresponding to the region conforms to a predetermined contrast; and the verification code input prompt information is used to prompt to input a specified verification code in the verification code image.

2. The method according to claim 1, wherein the verification codes on the verification code image at least comprise a first verification code and a second verification code, wherein,
in the first verification code, pixels within a same region are continuous, and at least two regions are spaced by pixel interval; and
in the second verification code, all regions have identical width or identical height, and adjacent regions are in different colors.

3. The method according to claim 1, wherein the verification code is in a form of character, and the verification code image comprises verification codes in at least two different fonts.

4. A non-transitory computer-readable storage medium having instructions stored thereon, wherein the instructions, when being executed by a computer device, cause the computer device to perform the method according to claim 1.

5. The method according to claim 1, wherein pixels within a same region of the verification code are continuous, and at least two regions of the verification code are spaced by pixel interval.

6. The method according to claim 5, wherein
at least one verification code on the verification code image is in a form of a character; and
character strokes within a same region of the verification code are continuous, and character strokes are discontinuous between at least two regions of the verification code.

7. The method according to claim 1, wherein a width or height direction of each of the plurality of regions in the verification code is parallel to an overall width or height direction of the verification code; or a width or height direction of each of the plurality of regions in the verification code is parallel to an overall width or height direction of the verification code image.

8. The method according to claim 7, wherein the plurality of regions in the verification code have identical width or identical height, and adjacent regions are in different colors.

9. A method for verification code processing, comprising:
receiving a triggering request for verification code display, and determining a verification code image and verification code input prompt information; wherein the verification code image comprises one or more verification codes, each verification code on the verification code image is divided into a plurality of regions, and in each verification code all of the plurality of regions are in different colors, a color difference between at least one of the plurality of regions in the verification code and a background corresponding to the region conforms to a predetermined contrast; and
sending the verification code image and the verification code input prompt information in response to the triggering request; wherein the verification code input prompt information is used to prompt to input specified verification codes in the verification code image.

10. The method according to claim 9, wherein before determining the verification code image and the verification code input prompt information, the method further comprises:

dividing the verification code into a plurality of regions;
determining colors respectively corresponding to the plurality of regions, wherein at least two regions among the plurality of regions are in different colors; and
drawing the verification code on a background image based on the colors respectively corresponding to the plurality of region, to obtain the verification code image with the verification code.

11. The method according to claim 10, wherein the verification code is in a form of a character, and dividing the verification code into the plurality of regions comprises:
dividing the verification code into the plurality of regions based on continuity between character strokes, wherein character strokes are discontinuous between adjacent regions.

12. A device comprising:
a memory,
a processor, and
a computer program stored in the memory,
wherein the processor, when executing the computer program, performs:
acquiring a verification code image and verification code input prompt information in response to a triggering operation for verification code display; and
displaying the verification code image and the verification code input prompt information; wherein the verification code image comprises one or more verification codes, each verification code on the verification code image is divided into a plurality of regions, and in each verification code all of the plurality of regions are in different colors, a color difference between at least one of the plurality of regions in the verification code and a background corresponding to the region conforms to a predetermined contrast; and the verification code input prompt information is used to prompt to input a specified verification code in the verification code image.

13. The device according to claim 12, wherein pixels within a same region of the verification code are continuous, and at least two regions of the verification code are spaced by pixel interval.

14. The device according to claim 13, wherein
at least one verification code on the verification code image is in a form of a character; and
character strokes within a same region of the verification code are continuous, and character strokes are discontinuous between at least two regions of the verification code.

15. A device comprising:
a memory,
a processor, and
a computer program stored in the memory,
wherein the processor, when executing the computer program, performs:
receiving a triggering request for verification code display, and determining a verification code image and verification code input prompt information; wherein the verification code image comprises one or more verification codes, each verification code on the verification code image is divided into a plurality of regions, and in each verification code all of the plurality of regions are in different colors, a color difference between at least one of the plurality of regions in the verification code and a background corresponding to the region conforms to a predetermined contrast; and
sending the verification code image and the verification code input prompt information in response to the triggering request; wherein the verification code input prompt information is used to prompt to input specified verification codes in the verification code image.

16. The device according to claim 15, wherein the processor is further configured for:
dividing the verification code into a plurality of regions;
determining colors respectively corresponding to the plurality of regions, wherein at least two regions among the plurality of regions are in different colors; and
drawing the verification code on a background image based on the colors respectively corresponding to the plurality of region, to obtain the verification code image with the verification code.

17. The device according to claim 16, wherein the verification code is in a form of a character, and the processor is further configured for:
dividing the verification code into the plurality of regions based on continuity between character strokes, wherein character strokes are discontinuous between adjacent regions.

* * * * *